United States Patent [19]

Staniland

[11] Patent Number: 4,960,851
[45] Date of Patent: Oct. 2, 1990

[54] CRYSTALLINE AROMATIC POLYETHERSULPHONES HAVING TERPHENYLENE LINKAGES

[75] Inventor: Philip A. Staniland, Middlesbrough, England

[73] Assignee: Imperial Chemical Industries PLC, London, Great Britain

[21] Appl. No.: 315,738

[22] Filed: Feb. 27, 1989

[30] Foreign Application Priority Data

Mar. 1, 1988 [GB] United Kingdom ................. 8804861

[51] Int. Cl.$^5$ ............................................. C08G 61/12
[52] U.S. Cl. ................................. 528/125; 528/126; 528/128; 528/174; 528/175
[58] Field of Search ............... 528/125, 126, 128, 174, 528/175

[56] References Cited

U.S. PATENT DOCUMENTS

| | | | |
|---|---|---|---|
| 3,770,832 | 11/1973 | Leslie | 568/33 |
| 4,446,294 | 5/1984 | Rose et al. | 528/125 |
| 4,486,576 | 12/1984 | Colon et al. | 525/471 |

FOREIGN PATENT DOCUMENTS 0232019  8/1987  European Pat. Off. .

*Primary Examiner*—Morton Foelak
*Assistant Examiner*—Frederick Krass
*Attorney, Agent, or Firm*—Cushman, Darby & Cushman

[57] ABSTRACT

A crystalline polyethersulphone comprises repeating units Ph $SO_2$ $Ph_3$ $SO_2$ Ph alone or together with $Ph_n$ and optionally together with up to 20 mole % of other repeating units, said units being connected by ether linkages, and wherein Ph is 1,4 - phenylene and n is an integer 1 or 2.

10 Claims, No Drawings

CRYSTALLINE AROMATIC POLYETHERSULPHONES HAVING TERPHENYLENE LINKAGES

The present invention relates to aromatic polymers, composite materials based on such polymers and the production of such polymers. The invention relates particularly to polyethersulphones containing terphenylene linkages.

There are many commercially available polymers wherein aromatic rings, are linked together by oxygen (ether), sulphur and sulphone linkages. These polyether sulphones are generally amorphous with high glass transition temperatures, for example over 200° C., in some cases at least 250° C. However, being amorphous, they are vulnerable to attack by a range of solvents, including hydrocarbon liquids. The polysulphone of the formula:

[PhSO$_2$Ph$_3$SO$_2$PhOPhSO$_2$PhO]$_n$ wherein Ph is 1,4-phenylene, was disclosed by T. E. Attwood et al (Polymer, 1977 18 369) to have Tg=289° C., but was not crystalline from the melt.

In the ensuing description the following abbreviations will be used:
DSC differential scanning calorimetry;
Tm melting point, the temperature at which the main peak of the melting endotherm is observed;
Tc temperature at which crystallisation occurs on cooling the melt before or after solidification;
Tg glass transition temperature;
IV inherent viscosity, as measured at 25° C. on a solution of 0.1 g of polymer in 100 cm$^3$ of solution in sulphuric acid of density 1.84 g/cm$^3$ IV=10 In Ts/To, where Ts and To are the flow times of solvent and solution respectively; and
RV reduced viscosity, as measured at 25° C. on a solution of 1.0 g of polymer in 100 cm$^3$ of solution in sulphuric acid of density 1.84 g/cm$^3$ RV=(Ts/To) −1.

The determination of Tg by DSC is carried out by examining a 10 mg sample of polymer in a Perkin Elmer DSC-4 and or DSC-/instrument, using a heating rate of 20° C./min under nitrogen. From the resulting curve the onset of the Tg transition is obtained. This is measured as the intersection of lines drawn along the pre-transition baseline and a line drawn along the greatest slope obtained during the transition.

According to a first aspect of the present invention, a crystalline polyethersulphone comprises repeating units I either alone or together with repeating units II and optionally together with up to 20 mole % of other repeating units, said units being connected by ether linkages, units I and II being of formulae:

PhSO$_2$Ph$_3$SO$_2$Ph     I

Ph$_n$    II, respectively, wherein:
Ph is 1,4-phenylene; and
n is an integer 1 or 2;
said other repeating units comprising divalent aromatic units containing activating groups selected from —CO— and —SO$_2$—.

Polymers of the first aspect of this invention are crystalline and exhibit a commercially desirable combination of Tg and crystalline melting point.

Polymers of this invention are characterised by one or more of:
(i) being 10–60% crystalline, especially 15–40%, after annealing;
(ii) being tough when formed into an amorphous film by compression moulding and are preferably tough when formed into a crystalline film;
(iii) being resistant to a wide range of solvents when crystalline, in particular being, on immersion for 24 hours in methylene chloride (CH$_2$Cl$_2$) at 20° C., "essentially unaffected", that is, not dissolving or becoming unworkably soft and, preferably, gaining not more than 20% by weight;
(iv) having a Tg of at least 200° C.; and
(v) having a Tm of below 400° C.

Thus these polymers are particularly useful for applications which require resistance to solvents and to high temperatures.

Polymers in accordance with the invention can be melt processed into shaped articles, including films and insulating coatings on electrical conductors or used as matrices in composites. They can be used in applications for which polyethersulphones and/or polyaryletherketones have been proposed previously. In particular they may be used for those applications which require a combination of one or more of good electrical insulating properties, good resistance to a wide range of chemicals, retention of mechanical properties up to high temperature, good resistance to burning and the emission of low proportions of toxic fumes and with low smoke density on burning. Films whether undrawn, uniaxially-drawn or biaxially-drawn are especially useful when made of these polymers.

Whilst for many applications the polymers of the invention may be used with few if any additives, other than stabilisers, additives may be incorporated for example inorganic and organic fibrous fillers such as of glass, carbon or poly-paraphenylene terephthalamide; organic fillers such as polysulphones, polyketones, polyimides, polyesters and polytetrafluoroethylene at various levels of compatibility; and inorganic fillers such as graphite, boron nitride, mica, talc and vermiculite; nucleating agents; and stabilisers such as phosphates and combinations thereof.

Typically the total content of additives is 0.1 to 80%, especially at most 70% by weight of the total composition. The composition can contain for example 5 to 30% by weight of boron nitride; or at least 20% by weight of short glass or carbon fibre; or 50 to 70% especially about 60%, by volume of continuous glass or carbon fibre; or a mixture of a fluorine-containing polymer, graphite and an organic or inorganic fibrous filler and the total proportion of these additives is preferably 20 to 50% by weight of the total composition.

The composition may be made by mixing the polymer with the additives for example by particle or melt blending. More specifically the polymeric material, in the form of dry powder or granules, can be mixed with the additives using a technique such as tumble blending or high speed mixing. The blend thus obtained may be extruded into a lace which is chopped to give granules. The granules can be subjected to a forming operation, for example injection moulding or extrusion, to give a shaped article.

Alternatively the composition may be film, foil, powder or granules of the polymer with or without particulate additives, laminated with a fibrous filler in the form of mats or cloths.

Alternatively a composition containing fibrous filler may be obtained by passing essentially continuous fibre, for example glass or carbon fibre, through molten polymer or a mixture containing it in a dissolved or finely dispersed state. The product obtained is a fibre coated with polymer and may be used alone, or together with other materials, for example a further quantity of the polymer, to form a shaped article. The production of compositions by this technique is described in more detail in EP-A Nos. 56703, 102158 and 102159.

In the production of shaped articles from the polymers of the invention, or from polymer compositions containing them, desirably the crystallinity of the polymer is developed as far as possible during the fabrication process, including any annealing stage, because in subsequent use an article which can continue to crystallise can suffer dimensional changes, warping or cracking and general change in physical properties. Furthermore, increased crystallinity results in improved environmental resistance. It also can increase Tg significantly, providing a major advance in heat-resistance.

If desired, for further improved crystallisation behaviour, polymers of the invention may be modified by forming, on the polymeric chains, terminal ionic groups —A—X, where A is an anion and X is a metal cation, as described in more detail in our EP-A No. 152161. The anion is preferably selected from sulphonate, carboxylate, sulphinate, phosphonate, phosphate, phenate and thiophenate and the metal cation is an alkali metal or alkaline earth metal. By such modification the temperature Tc for the onset of crystallisation, may be raised by at least 2° C. in comparison with a similar polymer not containing the ionic end-groups. However, useful polymers are obtained even when there is little or no change in Tc if sufficient nucleation results from the presence of end groups to increase the number of spherulites in comparison with a similar composition not containing the ionic end groups.

Such modified polymers are most suitably produced by reaction of a preformed polymer with reactive species containing the ionic group. For example, if the polymer has a terminal group selected from fluoro, chloro and nitro the reactive species contains a nucleophilic group such as a phenate or thiophenate or a group of formula —A—X.

Modified polymers containing terminal ionic groups may be used alone or in a blend with unmodified polymers.

The polymers may in principle be made by an electrophilic process but are most suitably made by a nucleophilic process in which halides and phenols corresponding to the specified repeating units are polycondensed together in presence of one or more bases.

According to a second aspect of the present invention, a process for preparation of a crystalline polyethersulphone comprises polycondensing, under substantially anhydrous conditions in the presence of base, at least one compound of the formula III:

$$Y^1PhSO_2Ph_3SO_2PhY^2 \qquad III$$

and at least one compound of the formula IV:

$$Y^3ZY^4 \qquad IV$$

and optionally up to 20 mole % of at least one compound of the formula V:

$$Y^5Z^1Y^6 \qquad V$$

wherein

Z is selected from the group comprising:
$Y^7PhSO_2Ph_3SO_2PhY^8$; and
$Ph_n$;

wherein Ph is 1,4-phenylene and n is an integer from 1 or 2;

wherein $Z^1$ is a divalent aromatic unit containing activating groups selected from —CO— and —SO$_2$—; and wherein $Y^1$ to $Y^8$ are each independently a halogen atom or hydroxyl group, except when Z is $Ph_n$ wherein $Y^3$ and $Y^4$ are hydroxyl groups, said halogen atoms and hydroxyl groups being present in substantially equimolar amounts.

Examples of groups $Z^1$ are:
PhCOPh
PhCOPhCOPh
PhCOPhPhCOPh
PhCOPhPh
PhSO$_2$Ph
PhSO$_2$PhPhSO$_2$Ph
PhSO$_2$PhPhSO$_2$PhPh.

Other groups known to those skilled in the art may be employed.

Further, any of the repeating units can be introduced in the form of a polymer with any of the others, possibly as a residue left over in the reactor from a previous polycondensation leading to a polymer of the same structure or a structure tolerable as a blend or impurity. In any of these systems involving a haloaromatic reactant a copper catalyst can be used. The base is preferably at least one alkali metal hydroxide or carbonate, carbonate being suitably introduced as bicarbonate.

The molecular weight of the polymer obtained can be controlled by using an excess quantity of halogen or —OH as above-mentioned, and alternatively or additionally by including in the reaction mixture a small proportion, for example less than 5% mole, and especially less than 2% mole relatively to the monomers and/or the polyarylethersulphone, of a monofunctional compound such as a phenol or, preferably, an activated arylmonohalide.

The polycondensation reaction may be carried out in the presence or absence of a solvent.

Preferably a solvent is employed and is an aliphatic or aromatic sulphoxide or sulphone of the formula $$R—SO_a—R'$$

where:
a is 1 or 2; and
R and R', which may be the same or different, are alkyl or aryl groups, and may together form a divalent radical. Solvents of this type include dimethyl sulphoxide, dimethyl sulphone, and sulpholane (1,1-dioxothiolan) but the preferred solvents are aromatic sulphones of the formula:

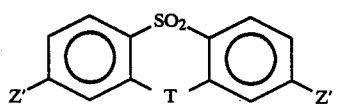

where T is a direct link, oxygen or two hydrogens (one attached to each benzene ring); and Z and Z', which may be the same or different, are hydrogen or alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl. Diphenylsulphone is preferred. Other solvents that may be used are to be found among that class classified as dipolar and aprotic, for example N-methyl-2-pyrrolidone. In addition co-solvents and diluents may be present. An azeotrope may be used to remove water from the reaction mixture.

The proportion of solvent used is typically such that the content of polymer and polycondensable material present is in the range 15-25% by weight, it need not all be in solution, and it may be advantageous to operate such that polymer separates as it is formed.

In the polycondensation reaction mixture, if an alkali metal hydroxide is used, this is preferably pre-reacted with the halophenol or bisphenol. The resulting phenate should preferably be in a finely divided form, for example having a particle size of less than 1.0 preferably less than 0.5 mm more preferably less than 0.1 mm. The phenate is conveniently formed in aqueous or methanolic solution and, since the polycondensation should be effected in the essential absence of —OH containing compounds such as water and alcohols, it is necessary to remove such compounds prior to effecting the polycondensation. Thus the halophenol or bisphenol may be stirred in a solution of alkali metal hydroxide in water or a 90:10 by volume mixture of methanol and water, preferably in the ratio of 1 mole of phenol groups to at least one mole of hydroxide, until it has dissolved; then the solvent may be evaporated off, for example by spray drying. Any hydrated phenate obtained is preferably dehydrated for example by evaporation under reduced pressure, or by heating, preferably in the presence of a diaryl sulphone, at above 150° C., preferably above 200° C. and preferably under partial vacuum, e.g. 25 to 400 torr. A particular advantage in dehydration of the phenate in the presence of a diaryl sulphone in the polycondensation vessel is that, because the diaryl sulphone does not boil, there is no splashing of the phenate on the walls of the reaction vessel and hence stoichiometry of the polycondensation reaction is maintained. Any dihalo-benzenoid monomers to be used in the polycondensation can be added after evolution of water has ceased, for example as indicated by cessation of foaming. After removal of the water, and addition of any necessary dihalo-benzenoid monomers and/or additional base, the temperature is increased to the polycondensation temperature.

If the base is an alkali metal carbonate added as such or as bicarbonate, whether for the whole base requirement or as an addition to the phenate, it is preferably anhydrous. However, if hydrated it may be dehydrated during heating up to the polycondensation temperature if that temperature is high enough.

The condensation agent may comprise one or more alkali or alkaline earth carbonates. In this specification it is to be understood that bicarbonates may be employed in addition to or in place of carbonates.

Generally a mixture containing an alkali or alkaline earth carbonate and a higher alkali carbonate is preferred. The higher alkali carbonate may be potassium carbonate although the caesium or rubidium salts may be employed. The alkali or alkaline earth carbonate may comprise sodium carbonate, lithium carbonate or other alkaline earth carbonates or mixtures thereof. Mixtures may also include a minor proportion of the higher alkali carbonate, the latter serving to activate the larger proportion of lower alkaline earth carbonates. Use of such mixtures is disclosed in GB No. 1586972. Use of lithium carbonate in admixture with potassium carbonate is illustrated in U.S. Pat. No. 4,636,557.

The base is desirably used in a finely divided form since we have found that with coarse materials the product obtained may have a lower IV. The base or mixture of bases may also be milled to reduce particle size and increase surface area prior to use.

In order to achieve a satisfactory molecular weight the alkali metal hydroxide, carbonate or bicarbonate should be used preferably in excess over the stoichiometric proportion, the excess being particularly in the range 1 to 15%, for example 2%, molar.

The polycondensation may also be conducted in the presence of an additional salt or salts especially where the cation comes from Group IA or IIA of the Periodic Table and especially where anion is a halide, an aryl sulphonate a carbonate, a phosphate, a borate, a benzoate, a terephthalate or carboxylate. Such salts may be generated or added, at any stage of the polycondensation.

If a copper containing catalyst is used the copper is preferably not more than 1%, preferably less than 0.4%, but desirably at least 0.01%, molar with respect to the monomers. A wide range of materials may be used, cupric and cuprous compounds and also metallic copper and suitable alloys being usable to introduce the copper containing catalyst. Preferred copper compounds are essentially anhydrous and include cuprous chloride, cupric chloride, cupric acetylacetonate, cuprous acetate, cupric hydroxide, cupric oxide, basic cupric carbonate, basic cupric chloride and particularly cuprous oxide. Catalysis by copper is described in more detail in our EP-A No. 182648 published May 28, 1986 and British application No. 8527756 filed Nov. 11, 1985. The stoichiometric excess of the alkali metal hydroxide, carbonate or bicarbonate is calculated after allowing for reaction with the copper compound if it is a salt of a strong acid and disregards any basicity of the copper compound.

If the polycondensation is effected in the presence of a copper containing catalyst, removal of copper residues from the polymer at the completion of the polymerisation is very desirable. Especially if the polymer has been efficiently end-capped, for example with 4,4'-dichlorodiphenylsulphone, the residues may be removed using a complexing agent such as ethylenediamine tetraacetic acid and thereafter washing the polymer with water or a mixture of water and methanol.

The polycondensation reaction is carried out at least 150° C., preferably in the range 250° C. to 400° C., particularly 280° C. to 350° C. An increase in reaction temperatures leads to shorter reaction times but with risk of product decomposition and/or side reactions whereas a decrease in reaction temperature leads to longer reaction times but less product decomposition.

However a temperature should be used which maintains the polymer at least partly in solution. In general the solubility of polymer in the polycondensation solvent, for example a diaryl sulphone, increases with temperature. Solubility also increases with increasing proportion of sulphone groups in the polymer chain, hence polymers having a higher proportion of sulphone groups can, if desired, be produced at slightly lower polymerisation temperatures. It has been found that better results are obtained if after melting the reactants, the temperature is increased to the polycondensation temperature over several hours.

In order to obtain products of improved properties, it may be advantageous to use a prepolycondensation stage in which the monomers are heated together at a temperature at which some oligocondensation occurs but little, if any, polycondensation occurs. Such prepolycondensation can be effected at 200° C. to 250° C., particularly 220° C. to 245° C. The prepolycondensation is believed to result in the formation of relatively involatile oligomers and hence to reduce the possibility of volatile monomers being removed from the reaction mixture.

The polycondensation is preferably carried out in an inert atmosphere, for example argon or nitrogen. The reaction vessel can be made from glass but for operation on a large scale is preferably made from stainless steels (other than those which undergo surface crazing at the reaction temperatures in the presence of alkali metal halide), or made of, or lined with, titanium, nickel or an alloy thereof or some similarly inert material.

To neutralise any reactive oxygen-containing anions, a reagent therefor may be introduced into the polycondensation reaction. Reactive monofunctional halides, for example methyl chloride, and reactive aromatic halides such as, for example, 4,4'-dichlorodiphenylsulphone, 4,4'-dichloro-benzophenone, 4-chlorodiphenylsulphone or 4-chloro-benzophenone are particularly suitable.

At the completion of polycondensation, the reaction mixture may be (i) allowed to cool and, depending on the polycondensation solvent, to solidify, (ii) ground, (iii) treated to remove any polymerisation solvent, for example by extraction with a solvent therefor, conveniently a mixture of acetone or an alcohol for example methanol, then with water to remove the salts, and finally (iv) dried. Additionally, the polymer may be treated to remove copper residues.

Use of the biphenols, $HOPh_{1-2}OH$, to the exclusion of more acidic bisphenols e.g. Bis-S, is preferred in production of polymers of this invention. Polymers not derived from large proportions of more acidic bisphenols have been found to be more easily washed free from inorganic salts. A minor proportion of more acidic bisphenols may be employed without unduly detracting from the ease of washing. Absence of more acidic bisphenol monomers or residues in the partially or wholly formed polymers reduces or eliminates the products resultant from ether scrambling reactions, facilitating control of the properties of the polymers. Furthermore inclusion of biphenylene groups in $Ph_n$ usefully reduces the incidence of ether scrambling.

Polymers of this invention preferably comprise at least 30 mole %, and more particularly at least 50 mole %, of repeating unit I.

The polymers of this invention are usually highly crystalline as made. This crystallinity is lost on melting and amorphous products may be made by quenching thin specimens into cold water. Crystallinity may be restored by cooling the melt, at about 20° C./min, or by annealing at a temperature between Tg and Tm. The products of this invention are conveniently annealed at 300° C. for 90 minutes.

Crystallinity may be assessed by several methods for example by density, by ir spectroscopy, by X ray diffraction or by DSC. The DSC method has been used to evaluate the crystallinity that developed in samples annealed at 300° for 90 mins in a nitrogen atmosphere. A heating rate of 20° C./min was used until a temperature of 450° C. was attained. A baseline was then constructed under the melting endotherm and the enclosed area used to calculate the heat of fusion of the sample in joules/g. Assuming a heat of fusion of 130 joules/g for the crystalline material present, which could be in error by as much as 20%, the degree of crystallinity was calculated.

We refer to degrees of crystallinity of:
30% or above as very highly crystalline
20% as highly crystalline
10% as crystalline
below 10% as slightly crystalline.

At least 10% crystallinity is required for useful products to be made, that is products with enhanced solvent resistance, but values of at least 20% are preferred.

When the toughness of the polymers is to be determined, the test most frequently used consists in compression - moulding a film about 0.3 mm thick from a sample of the polymer at a temperature at least 40° C. above the polymer melting point in a press (4400 $MN/m^2$ for 5 minutes), then either cooling the film slowly to induce complete crystallisation or else quench cooling and annealing it to induce the requisite crystallisation. The film is flexed through 180° to form a crease, whereby the two faces of the film formed about the crease touch. The film is compressed manually to form the crease line. If the film survives this treatment without breaking (e.g. snapping or tearing) it is deemed to be tough; if it fails on the formation of the crease, it is deemed to be brittle and if it fails during the test it is regarded as moderately tough.

The invention is illustrated by the following Examples

Example 1

4,4''-bis-(4-chlorophenylsulphonyl)-p-terphenyl (0.020 mole, 11.60 g) hydroquinone (0.020 mole, 2.20 g) and diphenyl sulphone (60 g) were heated together in a 250 ml, 3 necked, round bottomed, glass flask equipped with nitrogen inlet, thermocouples, stirrer and air condenser to a temperature of 180° C. Potassium carbonate (0.0204 mole, 2.82 g) was added while maintaining a nitrogen blanket and the temperature raised in stages (0.5 h at 225° C., 0.5 h at 275° C., 1.0 h at 320° C.) to a maximum of 320° C.

The viscous product was removed from the flask and when cooled ground in laboratory hammer mill through a 2.0 mm screen. The ground product was extracted successively with 1:1 acetone/methanol x3, water x3 and 1:1 acetone/methanol x3 by stirring in a beaker.

The polymer thus freed of reaction solvent and inorganic by-products was dried under vacuum at 140° C. and found to have an IV of 0.33, a Tg of 259° C. and a Tm 393° C. The polymer could be crystallised from the melt.

Example 2

A polymer was prepared in a similar manner to Example 1 except that the hydroquinone was replaced by biphenol (0.020 mole, 3.72 g). This polymer had an IV of 0.43, a Tg of 264° C. and a Tm of 383° C. and could also be crystallised from the melt.

Example 3

A polymer was prepared in a similar manner to Example 1 except that the hydroquinone was replaced by 4,4''-bis-(4-hydroxy phenyl sulphonyl)-p-terphenyl, the bisphenol resulting from alkaline hydrolysis of 4,4''-bis-(4-chlorophenyl suphonyl)-p-terphenyl. The Polymer had an IV of 0.42, a Tg of 311° C. and a Tm of 398° C. and could be crystallised from the melt.

Example 4 (Comparative)

A polymer was prepared in a similar manner to Example 1 except that the hydroquinone was replaced by 4,4'-dihydroxy benzophenone (0.020 mole, 4.28 g).

This polymer had an IV (in DMF) of 0.31, a Tg of 281° C. and was amorphous.

Example 5 (Comparative)

A polymer was prepared in a similar manner to Example 1 except that the hydroquinone was replaced by bisphenol 'S'.

This polymer had an RV (in DMF) of 0.31, a Tg of 281° C. and was amorphous.

I claim:

1. A melt crystallizable thermoplastic polyethersulphone comprising repeating units I either alone or together with repeating units II and optionally together with up to 20 mole % of other repeating units, said units being connected by ether linkages, units I and II being of formulae:

$$PhSO_2Ph_3SO_2Ph \qquad \text{I}$$

$$Ph_n \qquad \text{II}$$

respectively, wherein:
Ph is 1,4-phenylene; and
n is an integer 1 or 2;
said other repeating units comprising divalent aromatic units containing activating groups selected from —CO— and —SO$_2$—.

2. A polyethersulphone according to claim 1, comprising repeating unit I alone.

3. A polyethersulphone according to claim 1, comprising only repeating units I and II.

4. A polyethersulphone according to claim 1, in which said other repeating units are selected from a group comprising:
PhCOPh
PhCOPhCOPh
PhCOPhPhCOPh
PhCOPhPh
PhSO$_2$Ph
PhSO$_2$PhPhSO$_2$Ph
PhSO$_2$PhPhSO$_2$PhPh.

5. A polyethersulphone according to claim 1, comprising at least 30 mole % of repeating unit I.

6. A polyethersulphone according to claim 1, characterised by one or more of:
(i) being 10–60% crystalline, after annealing;
(ii) being tough when formed into an amorphous film by compression moulding and, optionally also, being tough when formed into a crystalline film;
(iii) being resistant to a wide range of solvents when crystalline, being, on immersion for 24 hours in methylene chloride at 20° C., "essentially unaffected", that is, not dissolving or becoming unworkably soft and, optionally also, not gaining more than 20% by weight;
(iv) having a Tg of at least 200° C.; and
(v) having a Tm below 400° C.

7. A process for preparation of a melt-crystallizable thermoplastic polyethersulphone comprising polycondensing, under substantially anhydrous conditions in the presence of base, at least one compound of formula III:

$$Y^1\text{—Ph—}SO_2\text{—}Ph_3\text{—}SO_2\text{—Ph—}Y^2 \qquad \text{III}$$

and at least one compound of formula IV:

$$Y^3\text{—}Z\text{—}Y^4 \qquad \text{IV}$$

and optionally up to 20 mole % of at least one compound of formula V:

$$Y^5\text{—}Z^1\text{—}Y^6 \qquad \text{V}$$

wherein Z is selected from the group comprising:
$Y^7$—Ph—$SO_2$—$Ph_3$—$SO_2$—Ph—$Y^8$; and
Ph$_n$;
wherein
Ph is 1,4-phenylene and n is an integer 1 or 2;
wherein $Z^1$ is a divalent aromatic unit containing activating groups selected from —CO— and —SO$_2$—; and
wherein $Y^1$ to $Y^8$ are each independently a halogen atom or hydroxyl group, except when Z is Ph$_n$ wherein $Y^3$ and $Y^4$ are hydroxyl groups, said halogen atoms and hydroxyl groups being present in substantially equimolar amounts.

8. A process according to claim 7, wherein $Z^1$ is selected from a group comprising:
PhCOPh
PhCOPhCOPh
PhCOPhPhCOPh
PhCOPhPh
PhSO$_2$Ph
PhSO$_2$PhPhSO$_2$Ph
PhSO$_2$PhPhSO$_2$PhPh.

9. A shaped article made of or containing, optionally with one or more additives, a polyethersulphone according to claim 1.

10. A process for making a shaped article which comprises shaping a polyethersulphone, optionally with one or more additives, according to claim 1 and annealing the shaped article to develop the crystallinity of the polyethersulphone.

* * * * *